Patented July 20, 1948

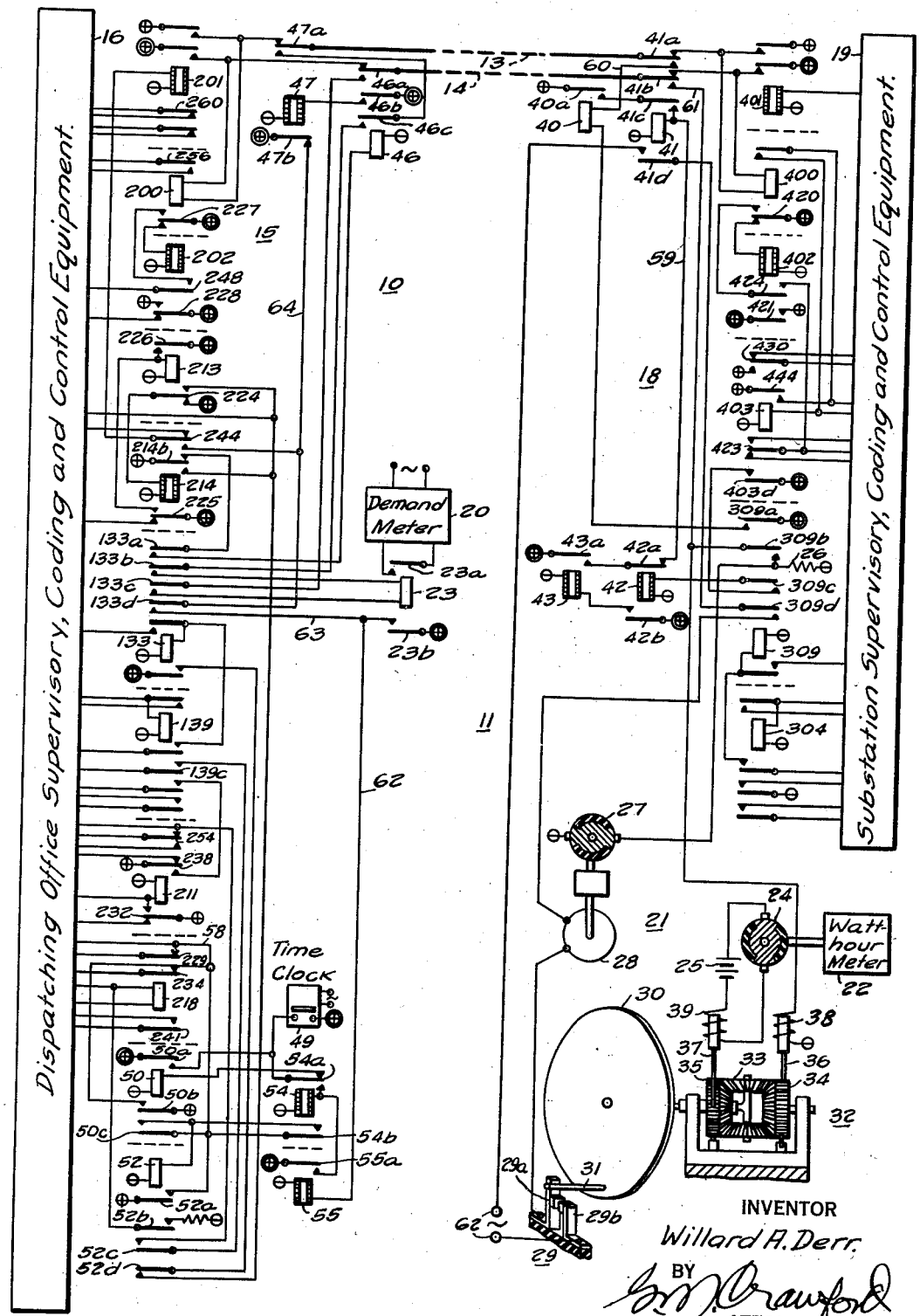

2,445,422

UNITED STATES PATENT OFFICE 2,445,422

CONTROL SYSTEM

Willard A. Derr, Wilkinsburg, Pa., assignor to Westinghouse Electric Corporation, East Pittsburgh, Pa., a corporation of Pennsylvania Application December 27, 1944, Serial No. 569,998

3 Claims. (Cl. 177—353)

My invention relates, generally, to control systems, and it has reference in particular to supervisory control systems.

Generally stated, it is an object of my invention to provide a supervisory control system having a telemetering point, and which is simple and inexpensive to manufacture and is efficient in operation.

More specifically it is an object of my invention to provide for automatically obtaining, at periodic intervals, an indication of the integrated reading and demand of an electrical quantity at a remote station over a supervisory control system with a minimum of interference with other supervisory and control operations.

It is also an object of my invention to provide for storing electrical impulses at a remote station of a supervisory control system and releasing them at periodic intervals in order to obtain an indication at a dispatching office of the integrated reading of kilowatt hours and also of the kilowatt demand during predetermined intervals.

Another object of my invention is to provide at periodic intervals for reproducing telemetering impulses of electrical energy at a remote station in a supervisory control system, at a rate much greater than the original rate, and transmitting them over a supervisory control channel in relatively short intervals in response to timed signals from a dispatching office.

Yet another object of my invention is to provide for automatically obtaining telemetering indications over a supervisory control system during relatively short spaced apart operating intervals, unless some other supervisory function is being performed.

Still another object of my invention is to provide for storing telemetering impulses which are produced substantially continuously at a rate which varies with a quantity to be measured, and transmitting a corresponding number of telemetering impulses over a supervisory control channel at periodic intervals at a much higher rate without appreciably interfering with the operation of the supervisory control equipment to perform other functions.

Other objects will in part be obvious and will in part be explained hereinafter.

In practicing my invention, an impulse storage device is used to store telemetering impulses at a remote station and release them periodically at a rate which is greatly in excess of the storage rate. Transfer means are used to periodically disconnect the supervisory channel from the supervisory control equipment and connect it to telemetering means for transmitting and receiving the impulses. Timing means at the dispatching office periodically selects a telemetering point on the supervisory control system for effecting this operation, and upon the cessation of telemetering impulses, the supervisory control equipment is reset so as to be available for any other supervisory control operations until the initiation of the next metering interval.

For a more complete understanding of the nature and scope of my invention, reference may be made to the following detailed description, which may be studied in connection with the accompanying drawing, in which the single figure is a diagrammatic view of a supervisory control system embodying the invention in one of its forms.

The single figure of the drawing is a diagrammatic view of a supervisory control system wherein the reference numeral 10 may denote, generally, the dispatching office equipment, and the reference numeral 11 may denote, generally, equipment at a remote station which may be connected with the dispatching office by a single supervisory control channel represented by the conductors 13 and 14.

The reference numeral 15 may denote, generally, supervisory control equipment at the dispatching office, which may include a portion thereof represented by the enclosure 16. The supervisory control equipment 15 may be similar in general to that shown and described in the Boswau Patent 2,091,301, which issued on August 31, 1937, and the enclosure 16 represents, generally, a principal portion of the dispatching office equipment which is identical with that shown and described in detail in the Boswau patent. Equipment of the Boswau patent which has been changed in any respect is shown to the immediate right of the boxed enclosure. All parts of the equipment shown in the Boswau patent are designated by the same numerals as in the Boswau patent, and any additions or alterations are designated by numerals not appearing in the Boswau patent so as to distinguish them therefrom. The circuits of the line relay 200 and the impulsing relay 201 have been altered to provide for parallel circuit operation in a manner which is well known in the art, in order to permit metering over the supervisory channel.

In a like manner, the numeral 18 may designate, generally, supervisory control equipment at the remote station, which includes a principal portion thereof represented by the enclosure 19, which is identical in every respect with a principal portion of the remote station equipment shown and described in connection with the above mentioned Boswau patent. The equipment of the Boswau patent to which changes have been made is shown outside and immediately to the left of the enclosure. Equipment appearing in the Boswau patent is designated by the same numerals as used therein, whereas additional equipment is designated by different numerals not appearing in the Boswau patent. The circuits of the line relay 400 and the impulsing relay 401 have also been changed to provide for parallel circuit operation in order to permit metering over the channel.

In order to provide for obtaining indications at the dispatching office of the kilowatt demand at the remote station, as well as an integrated reading of the kilowatt hours, without tying up the supervisory control equipment for any longer than necessary, telemetering means such as the kilowatt hour demand meter 20 may be provided at the dispatching office for operation in conjunction with telemetering means such as the impulse storage device 21 at the remote station, which provides for storing impulses of electrical energy produced by a watthour meter 22 at the remote station during relatively long intervals and transmitting them at a rate much greater than the original rate over the supervisory channel at periodic intervals. The meter 20 may be operated in a well known manner by an impulse relay 23, responsive to impulses transmitted by the device 21.

The energy storage device 21 may be of substantially the same type as shown in Patent No. 2,286,180, which issued in June 9, 1942, to G. W. Pickels, and is assigned to the assignee of the present invention. It may, for example, comprise impulsing means such as the commutator device 24 which is disposed to be driven by the watthour meter 22 for producing impulses of electrical energy from a source such as the battery 25, at a rate which is dependent upon the rate of flow of electrical energy in the circuit which is being metered by the watthour meter 22. In order to provide for transmitting over the supervisory channel a corresponding number of impulses for operating the demand meter 20 at the dispatching office, without constantly tying up the supervisory channel, means may be provided for storing the impulses produced by the commutator device 24 during relatively long periods and transmitting them at a rate greater in excess of the rate of storage during relatively short periods by means of a commutator device 27 which may be operated by a motor 28 for periodically shunting a control resistor 26 to vary the current in the supervisory channel.

Operation of the motor 28 may be controlled by means of a contact device 29 which comprises a rotatable disk 30 having a pin 31 projecting therefrom for urging a movable contact 29a away from a stationary contact 29b, which contact members are connected in the operating circuit of the motor 28. Operation of the disk 30 may be controlled by a differential device 32 having planetary gears 33 for operatively connecting a pair of sun gears 34 and 35 which may be actuated by means of solenoid operated ratchet devices 36 and 37 having operating windings 38 and 39 connected in circuit relation with the commutator devices 24 and 27, respectively. The ratchet devices 36 and 37 may be so arranged that the disk 30 is permitted to rotate so as to permit engagement of the contacts 29a and 29b so long as there is a positive differential between the number of impulses produced by the commutator device 24 over the number transmitted by the commutator device 27.

In order to provide for transmitting telemetering impulses over the supervisory control channel without interfering with the operation of the supervisory control equipment, transfer means such as the transfer relays 40 and 41 may be provided at the remote station for disconnecting the supervisory control conductors 13 and 14 from the supervisory control equipment and connecting them to the telemetering means including the commutator device 27. Operation of the transfer relays 40 and 41 may be effected by means of control relays 42 and 43. The control relays may be of the delayed dropout type and may be arranged to produce a timed impulse at the end of the point selection check code, when the supervisory control relay 403 releases, for energizing the transfer relay 41.

At the dispatching office, similar transfer relays 46 and 47 may be provided for disconnecting the supervisory control channel from the supervisory control equipment and connecting it for telemetering. The transfer relay 47 may be of a delayed drop-out type in order to provide a slight time delay between the disconnection of the supervisory control channel from the metering circuits and the restoration thereof to the supervisory control equipment.

In order to provide for automatically determining the demand at the remote station and the integrated reading of the watthour meter 22 at periodic intervals, means such as the time-clock 49 may be provided for periodically effecting operation of the supervisory control equipment at the dispatching office to connect the supervisory control channel to the telemetering equipment. Means such as the control relay 50 may be provided for initiating the selection of a telemetering point in response to an impulse from the time-clock 49. In order to prevent any attempt to set up a telemetering circuit when the supervisory control equipment is performing some other operation, and to provide for returning the supervisory equipment to normal after a metering operation means such as the auxiliary or reset relay 52 may be provided, which operates under the control of the control relay 50 through an energizing circuit controlled by the supervisory control sending start relay 218 and other of the supervisory control relays of the Boswau patent which operate selectively during supervisory and control sending and receiving operations.

With a view to determining resetting the supervisory control equipment, as well as disconnecting the supervisory control channel from the metering equipment, a pair of auxiliary control relays 54 and 55 may be provided which maintain the reset relay 52 energized so long as telemetering impulses are received from the remote station. At the termination of impulses from the remote station, the auxiliary control relays operate to deenergize the reset relay and permit resetting of the supervisory control equipment in much the usual manner.

In operation, the time-clock 49 produces impulses at predetermined time intervals for which the demand is desired, for example, at 15 minute intervals. Upon the occurrence of an impulse, the control relay 50 is energized through a circuit extending from the negative terminal through the operating winding armature 54a and back contact to positive through the contacts of the time-clock. The control relay 50 picks up and seals in to direct positive through its armature 50a, and armature 54a of the auxiliary control relay 54.

Operation of the control relay 50 puts indirect positive on the supervisory control start relay 216 of the Boswau patent through armature 50b and its front contact, and back contact and armature 234 of the start relay 218. At the same time, an energizing circuit is provided for the reset relay 52 extending from the negative terminal through the operating winding of relay 52, front contact and armature 50c, and through conductor 58, and back contacts and armature 229 of the sending start relay 218 if no other supervisory control operation is being effected (this circuit is similar to the shunting circuit of the individual point relay 129 of the Boswau patent, and includes back contacts of the relays 217, 208 and 217 so that it cannot be completed if other supervisory or control operations are taking place, and if completed, prevents other supervisory or control operations from taking place).

The reset relay 52 operates armature 52d to open up the reset circuit which extends to the supervisory reset relay 214. At the same time the reset relay 52 provides for putting direct positive on the point selection code stop relay 212 of the Boswau patent through front contact and armature 52c, and armature 139c of the counting chain. The reset relay 52 further provides for connecting negative to the sending start relay 218 through armature 52b to start selection of the metering point at the remote station. A holding circuit is established for the reset relay 52 from direct positive through armature 52a and front contact, and armature 50c and front contact.

Selection of the particular point is effected in the usual manner, point relay 309 at the remote station picking up at the end of the point selection code to commence transmission of the point selection check code. The point relay 309 prepares a circuit for the control relay 42 through armature 309c, but this circuit is not completed until the relay 403 picks up during transmission of the point selection check code. Relay 403 completes an operating circuit for the relay 42 extending from negative, through the operating winding of relay 42, armature 309c and front contact, and front contact and armature 403d. Control relay 42 picks up and provides an operating circuit for the relay 43 through armature 42b and front contact.

At the dispatching office receipt of the point selection check code picks up the point relay 133, providing an energizing circuit for the auxiliary control relay 55 extending from negative through the operating winding of the relay 55, conductor 62, conductor 63, front contact and armature 133d, conductor 64, and back contact and armature 47b of the transfer relay 47. Relay 55 provides an operating circuit for the auxiliary control relay 54 through armature 55a and front contact. Control relay 50 drops when armature 54a disengages its back contact.

At the same time the point relay 133 provides an operating circuit for the transfer relay 46 through front contact and armature 133a, and back contact and armature 214b of the supervisory reset relay 214. The supervisory control conductors 13 and 14 are therefore disconnected from the supervisory equipment at the dispatching office and are connected to the impulse metering relay 23 through armatures 47a and 46b, and 46a.

When supervisory relay 403 at the remote station drops at the end of the point selection check code, the operating circuit of the control relay 42 is interrupted at armature 403d and front contact. Relay 42 being of the delayed dropout type remains in the energized position for some time, thus insuring that the transfer relays 46 and 47 at the dispatching office have operated. Then it drops, deenergizing relay 43. Since relay 43 is also of the delayed dropout type, an energizing circuit is provided from direct positive through armature 43a and front contact, and armature 42a and back contact, for the operating winding of the transfer relay 41. Relay 41 picks up, and completes an energizing circuit for the transfer relay 40 from direct positive through armature 309a and front contact, operating winding of the relay 40, front contact and armature 41a, conductor 13, armature 47a and front contact, armature 46b and front contact, armature 133b and front contact, winding of the telemetering impulse relay 23, front contact and armature 133c, front contact and armature 46a, conductor 14, armature 41b and front contact, conductor 61, and armature 309b and front contact, through control resistor 26 to negative. The supervisory channel is thus completely connected for telemetering.

At the same time the transfer relay 41 provides an energizing circuit for the motor 28 of the commutator device 27 extending from one terminal of the alternating-current source 62 through front contact and armature 41d, armature 309d and front contact of the point relay 309, operating winding of the motor 28 and contacts 29a and 29b of the impulse storage device 21. Energy impulses recorded by the commutator device 24 since the last interval of operation will have actuated the ratchet device 37 so as to rotate the disk 30 and permit closure of contacts 29a and 29b. Accordingly, the motor 28 operates the commutator device 27, which effectively shunts the control resistor 26 and provides for periodically increasing the current in the supervisory control channel each time the commutator device 27 rotates. All the transfer relays remain energized during the reductions in current between energy impulses, but the impulsing relay 23 which operates the demand meter 20 at the dispatching office follows the impulses and picks up each time the resistor 26 is shunted, maintaining the slow release auxiliary control relay 55 in the energized position.

Each time the commutator device 27 impulses, the impulse is recorded by the demand meter 20 and the ratchet device 36 is operated tending to rotate the disk 30 in a direction to separate the contacts 29a and 29b. Since the commutator device 27 operates at a much higher rate of speed than the commutator device 24, it transmits the previously recorded impulses of the commutator device 24 in a relatively short time. For example, the commutator device 27 may be arranged for transmitting the maximum number of impulses produced by the commutator device 24 during a fifteen minute interval, in about one minute. As soon as the commutator device 27 has transmitted as many impulses as the commutator device 24 has recorded during the preceding 15-minute interval, contacts 29a and 29b separate and impulse storage device 21 ceases to transmit impulses.

At the dispatching office, armature 23b opens and the auxiliary control relay 55 drops out upon the termination of the impulses, interrupting the energizing circuit for the control relay 54 at armature 55a. This interrupts the holding circuit for the reset relay 52 at armature 54b. The relay 52 deenergizes and picks up the supervisory control reset relay 214 through armature 52d and back contact. Relay 214 operates, interrupting the holding circuit of the transfer relay 46 at armature 214b. Transfer relay 46 is deenergized and disconnects the supervisory control channel from the telemetering circuit at armature 46a. This interrupts the line circuit and deenergizes the transfer relay 40 at the remote station which accordingly interrupts the holding circuit for its companion transfer relay 41 at armature 40a. A predetermined time after the deenergization of transfer relay 46, it companion transfer relay 47 drops and reconnects the supervisory control channel to the supervisory control equipment at armature 47a.

Reset of the supervisory control equipment is provided by the energization of the line relay 201 at the dispatching office, through an operating circuit extending from negative through the operating winding of relay 201, armature 244 and front contact of the reset relay 214, through back contact and armature 47b of the transfer relay 47. This produces the long reset pulse and the supervisory control system is thus restored to a normal condition ready for any subsequent supervisory control operation or a subsequent metering operation.

Should a supervisory or control operation be attempted while a telemetering operation is taking place over the supervisory channel, such supervisory or control function will merely be held in abeyance pending the end of the telemetering operation in a manner similar to that described in the Boswau patent with reference to conflicting supervisory or control operations. Likewise, should a supervisory or control operation be taking place when the metering clock closes its contacts, the control relay 50 merely seals in and awaits the termination of the supervisory or control operation whereupon the circuit for the relay 52 can be completed and the stored metering impulses transmitted.

From the above description and accompanying drawing, it will be apparent that I have provided, in a simple and effective manner, for automatically effecting periodic indications of the demand and integrated reading of an electrical quantity at a remote station. Operation of the telemetering means over the supervisory control channel is so effected as to utilize the channel only for a minimum of time, thus releasing it for operation or supervisory functions during a principal portion of the time.

Since certain changes may be made in the above-described construction and different embodiments of the invention may be made without departing from the spirit and scope thereof, it is intended that all the matter contained in the above description and shown in the accompanying drawing shall be considered as illustrative, and not in a limiting sense.

I claim as my invention:

1. In a supervisory control system having a dispatching office and a remote station with supervisory sending and receiving equipment normally available for operating in either direction over a single signal channel for selecting any one of a number of operating points over the channel to perform different control and supervisory operations, impulse telemetering means at a metering point at a remote station including means for producing electrical impulses at a rate proportional to a quantity to be measured and means for storing said impulses and producing an equivalent number of impulses at a much faster rate, demand indicating means at the dispatching office including an impulse operated demand meter having a predetermined demand interval, transfer means at the remote station and dispatching office operable under the control of the supervisory equipment for transferring the channel from the supervisory equipment to the telemetering means and the demand indicating means at the termination of a point selection check code, control means at the dispatching office including a time-clock operable at predetermined intervals corresponding to the demand interval to produce a timed impulse, a control relay operable in response to said impulse to effect operation of the supervisory equipment automatically to effect selection of the remote metering point and operation of the transfer means, and reset means at the dispatching office including a reset relay of the delayed dropout type disposed to be maintained in the operated position during receipt of the equivalent impulses and responsive to the termination of the equivalent pulses for rendering the transfer means inoperative and effecting reset of the supervisory equipment.

2. In a multiple point supervisory control system for a dispatching office and a remote station, supervisory control equipment at the office and station operating over a single signal channel to send and receive different impulse codes for selecting any one of the multiple points for performing one of a plurality of supervisory and control functions, telemetering transmitting means at the remote station including means for storing energy impulses at a rate dependent upon a quantity to be measured and producing a corresponding number of impulses at a later time at a rate greatly exceeding the storage rate, demand rate indicating means at the dispatching office including an impulse operated meter, transfer means at the dispatching office responsive to the termination of a check code in selecting the metering point to connect the channel to the indicating means, transfer means at the remote station including control relays of the delayed dropout type responsive to termination of said point selection check code for connecting the channel to the transmitting means after a time delay, control means including a time device at the dispatching office controlling the office supervisory control equipment for periodically selecting a metering point to effect operation of the transfer means at predetermined intervals of time to determine the demand since the previous interval, and reset means at the dispatching office responsive to the cessation of impulses when the number of impulses stored since the previous period of transmission is transmitted for rendering the transfer means inoperative and effecting reset of the supervisory equipment.

3. For use with a supervisory control system including a dispatching office and a remote station having supervisory equipment with a number of different control points including metering point selection relays at the office and station, telemetering means including means for storing energy impulses at a rate dependent upon a quantity to be measured and producing corresponding impulses under the control of a remote metering point relay at a later time interval at a rate greatly in excess of the storage rate, telemetering means at the dispatching office including an impulse operated meter device, transfer means normally connecting the channel to the supervisory equipment operable upon the selection of a metering point relay from the dispatching office to connect the channel to the telemetering means for recording during a relatively short interval the amount of the quantity to be metered which has been measured since the preceding interval, said means being operable to reconnect the channel to the supervisory equipment a predetermined time after it is disconnected from the telemetering means, means at the dispatching office for periodically selective a metering point at predetermined intervals of time, and means responsive to the cessation of stored impulses for rendering the transfer means inoperative and resetting the supervisory equipment.

WILLARD A. DERR.

REFERENCES CITED

The following references are of record in the file of this patent:

UNITED STATES PATENTS

| Number | Name | Date |
| --- | --- | --- |
| 1,919,992 | Stewart | July 25, 1933 |
| 1,942,424 | Hershey | Jan. 9, 1934 |
| 2,286,180 | Pickels | June 9, 1942 |
| 2,327,251 | Derr | Aug. 17, 1943 |
| 2,329,370 | Hicks | Sept. 14, 1943 |
| 2,372,593 | McWhirter | Mar. 27, 1945 |
| 2,376,752 | Bostwick | May 22, 1945 |